United States Patent [19]

De Lucia et al.

[11] Patent Number: 5,715,710
[45] Date of Patent: Feb. 10, 1998

[54] PORTABLE ANTI-THEFT DEVICE FOR MOTOR VEHICLE

[76] Inventors: Achille A. De Lucia, 1565-81 St., Brooklyn, N.Y. 11228; Roger De Lucia, 41 Park St., Staten Island, N.Y. 10306

[21] Appl. No.: 755,302

[22] Filed: Nov. 22, 1996

[51] Int. Cl.[6] ................................................ F16H 57/00
[52] U.S. Cl. .......................... 70/202; 70/201; 70/237
[58] Field of Search .............................. 70/202, 203, 201, 70/237, 238

[56] References Cited

U.S. PATENT DOCUMENTS

| | | | |
|---|---|---|---|
| 1,272,072 | 1/1918 | Madsen. | |
| 1,402,555 | 1/1922 | Whitehurst. | |
| 1,442,203 | 1/1923 | Williams et al. | 70/202 |
| 1,448,983 | 5/1923 | Wekerle. | |
| 1,560,582 | 12/1925 | Kagarise. | |
| 1,566,885 | 12/1925 | Laska. | |
| 2,812,669 | 11/1957 | Reff | 70/202 |
| 3,719,063 | 3/1973 | Fuces et al. | 70/202 |
| 4,632,209 | 12/1986 | Russell | 180/287 |
| 4,858,451 | 8/1989 | Balina | 70/202 |
| 4,912,952 | 4/1990 | Magrobi | 70/199 |
| 4,938,042 | 7/1990 | Muramatsu | 70/245 |
| 5,263,345 | 11/1993 | Zagorac | 70/201 |
| 5,267,458 | 12/1993 | Heh | 70/238 |
| 5,282,373 | 2/1994 | Riccitelli | 70/202 |
| 5,537,846 | 7/1996 | Simon | 70/202 |

FOREIGN PATENT DOCUMENTS

| | | | |
|---|---|---|---|
| 608220 | 10/1925 | France | 70/202 |
| 2419846 | 11/1979 | France | 70/202 |
| 2681823 | 4/1993 | France | 70/202 |
| 123069 | 10/1948 | Sweden | 70/202 |
| 0850440 | 8/1981 | U.S.S.R. | 70/238 |
| 2091656 | 8/1982 | United Kingdom | 70/237 |

*Primary Examiner*—Darnell M. Boucher
*Attorney, Agent, or Firm*—Robert W. J. Usher

[57] ABSTRACT

A brake pedal immobilizing device has first and second shafts with crossheads mounted thereon for relative longitudinal sliding movement to clamp a brake pedal shaft between them. The second shaft carries a stand-off formed by a floor engaging foot extending longitudinally aligned below the crossheads, supporting the device on the vehicle floor during clamping adjustment. The second crosshead is formed with a hook and is rotatively mounted on one end of the first shaft while the other crosshead is mounted on the first shaft in a screw fit. An upper end of the first shaft is received in a sleeve with a shaft locking mechanism and terminates in a handle. A third crosshead carries a third shaft slidingly received in the first crosshead and having a lower end forming a locking/wedging pin for receipt in a bore in the second crosshead in the clamping position to complete enclosure of the brake pedal shaft. A barrier frame is attached to the first crosshead above a brake pedal to block forcing tool access.

13 Claims, 2 Drawing Sheets

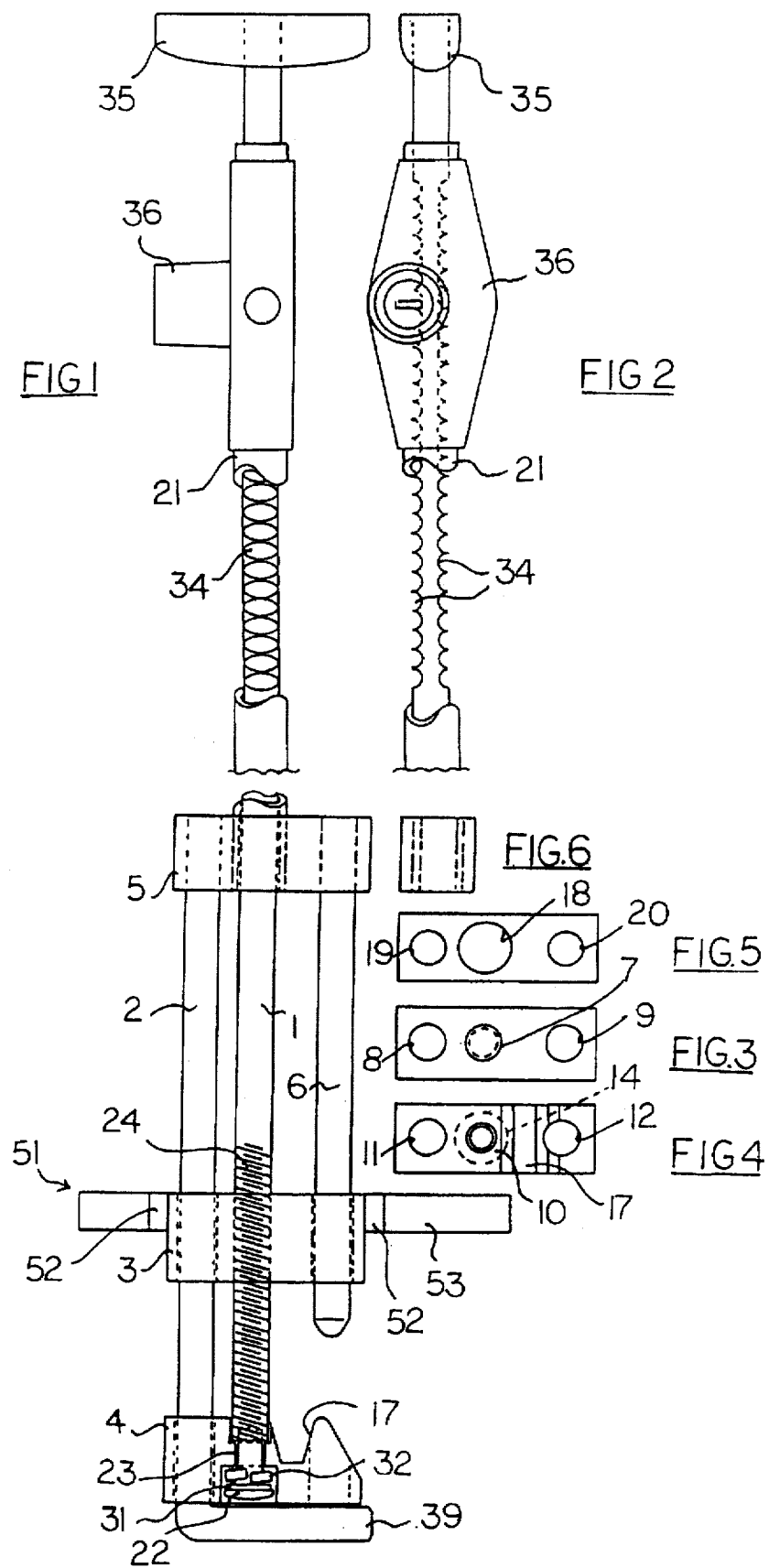

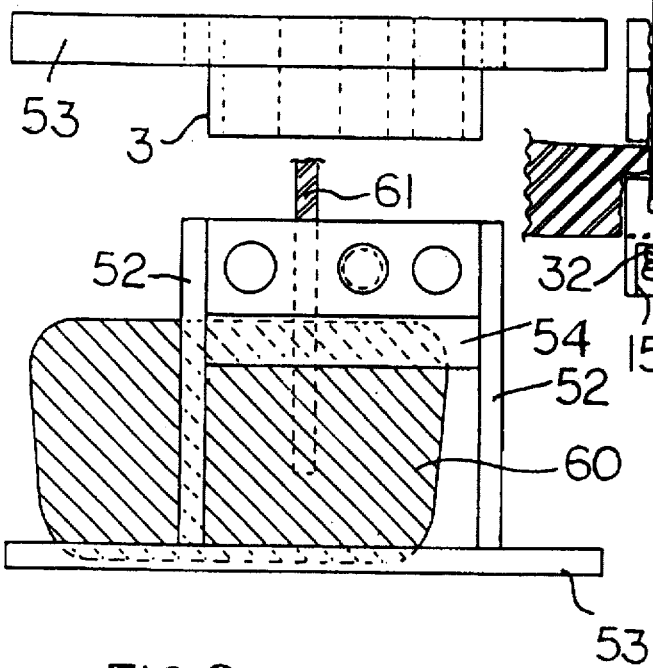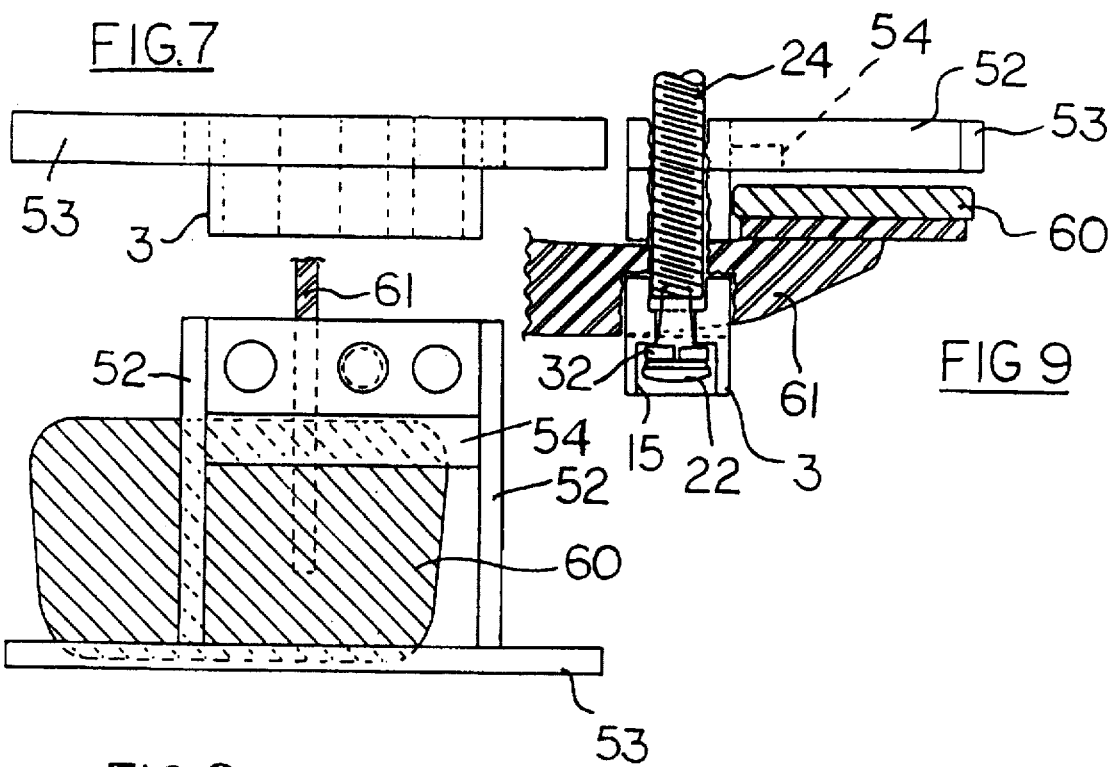

PORTABLE ANTI-THEFT DEVICE FOR MOTOR VEHICLE

FIELD OF THE INVENTION

The invention relates to a portable anti-theft device for immobilizing the brake pedal of a motor vehicle.

BACKGROUND OF THE INVENTION

Numerous anti-theft or locking devices for motor vehicles have been proposed over many years.

One particular approach has involved immobilization of the brake pedal to prevent operation thereof. U.S. Pat. No. 5,263,345 issued to Zagorac in 1993 teaches an immobilizing bracket hingedly anchored to the floor of the vehicle and coupled to the emergency brake lever for movement thereby from a lowered position flat, on the vehicle floor to a raised position extending behind the foot brake pedal preventing depression thereof.

However, such device is permanently installed in the vehicle which can be an expensive operation and prevents ready transfer between vehicles.

Another well known and widely used portable device of the prior art comprises first and second hook members having respective shaft members linked by telescopic assembly for clamping engagement of the jaws behind a brake pedal shaft and over the rim of the steering wheel, respectively to clamp the pedal immovably to the steering wheel. The telescopic shaft members include a sleeve carrying a lock mechanism with a catch for locking engagement in a selected transverse locking groove of a series extending along the shaft received in the sleeve locking the hook members in the clamping position.

To install the device, with the arm extended, the first hook member is engaged behind the brake pedal shaft and the second hook member aligned over the rim of the steering wheel and the telescopic assembly then collapsed, bringing the other hook member into clamping engagement with the rim.

However, maintaining the first hook member aligned behind the brake pedal shaft while guiding the second hook member onto the rim of the steering wheel and locking the shaft can be an awkward procedure, often requiring the users to employ the upper side of their feet to support the first jaw in position or to reach below the steering wheel to grasp the sleeve with one hand while lowering the second hook member into engagement with the rim and then turning the key in the lock with the other hand.

In addition, the unreinforced rim of the steering wheel is exposed and may be sawn through or otherwise severed relatively easily by a thief permitting release of the upper hook member from the rim enabling the car to be driven away.

In another proposal taught by U.S. Pat. No. 5,267,458 issued in 1993 to Heh, which still teaches reliance on clamping to the rim of the steering wheel, the lower hook member engages behind the accelerator instead of the brake pedal which is maintained depressed by a bifurcated, downwardly extendible locking member. Installation can still be relatively awkward as apparently requiring both the hook member to be maintained aligned behind the accelerator and the brake pedal locking member to be maintained aligned with the brake pedal during installation. The provision of the locking member and hook member in side by side relation also means that the device is not very compact and quite cumbersome. In addition, possible variations in the separation, configuration and travel of pedals on different models and types of vehicles would seem to place limitations on universal application. Furthermore, if the adjustment or tightening is imperfect there may be a risk of dislodgement form the pedals by persistent manipulation by a thief.

SUMMARY OF THE INVENTION

It is an object of the invention, to provide a portable anti-theft device for a vehicle which has the advantages of universal application and easy transfer between conventional vehicles of different types, when required, is relatively simple and easy to install, and yet which is secure in operation, in particular not requiring reliance on the strength of vulnerable and exposed parts of the vehicle such as the rim of the steering wheel which may be severed, while leaving the vehicle in drivable condition.

According to one aspect of the invention, there is provide a portable anti-theft device for immobilizing a brake pedal of a motor vehicle comprising: a jaw member extending transversely from a lower end of a first shaft member, for engagement behind a brake pedal; a stand-off comprising a foot extending transversely from a lower end of a second shaft member, aligned longitudinally below the jaw member, for engaging a floor of the vehicle below the brake pedal; means linking said first shaft member and said second shaft member for relative longitudinal movement in parallel relation thereby to adjust separation of the stand-off and the jaw member; handle means provided on an upper end of at least one of the shaft members so that the jaw member can be maintained aligned behind the brake pedal by resting the stand-off on the floor below the jaw member and the handle operated to raise the jaw member relatively away from the stand-off into clamping engagement behind the brake pedal with the stand-off remaining in position on the vehicle floor during and after adjustment; and, means for locking said first shaft member and said second shaft member together against the relative longitudinal movement to maintain a selected separation of the jaw member and stand-off in a brake pedal clamping position.

Thus, it is not necessary to rely on clamping to the steering wheel rim while difficulty of supporting the lower jaw member in alignment with the brake pedal during tightening is obviated by the provision of the stand-off which simply rests in the same position on the on the vehicle floor, throughout and after tightening, providing the necessary support.

As the foot is aligned below the jaw, the device remains desirably compact. The provision of the handle is provided on the upper end of a shaft member ensures that it is accessible to the user for positioning and adjustment/ tightening. In addition, the clamping elements are located in a position which is relatively inaccessible to the thief.

The transverse, floor engaging foot, also increasing difficulty of unauthorized dislodgement of the jaw member from the brake pedal.

Desirably, one shaft member provided with the handle means is formed with a screw thread and the linking means includes a first crosshead having first and second bores receiving the one shaft member in a screw fit and another shaft member in a longitudinal sliding fit, respectively, the one shaft member being rotatively connected to one of the jaw member and the stand-off so that rotation of the handle varies the separation of the jaw member and stand-off to bring the jaw member into and out from clamping engagement with the brake pedal.

The screw action adjustment is both easy to perform with one hand and ensures that the jaw member can be brought into tight engagement with the brake pedal. Preferably, the thread is left handed for ease of tightening, for most people.

The linking means may further comprise a second crosshead a portion of an upper side of which forms the jaw member, the second crosshead having first and second bores, said one shaft member being rotatively connected to the jaw member by rotative mounting in the first bore in the second crosshead and said another shaft member being received as a longitudinal sliding fit in the second bore of the second crosshead, so that rotation of the handle brings a lower side of the first crosshead and the jaw member into clamping engagement with a brake pedal shaft.

This construction both adds to stability and ease of operation.

In a preferred embodiment, the first bore is formed on the second crosshead at a location between the second bore and the jaw and a third bore is formed in a portion of the second crosshead located on an opposite side of the jaw member forming portion from the first bore and a wedging pin extends from the first crosshead in parallel relation to the first and second shaft member and aligned for receipt in the third bore when the jaw member is in clamping engagement with the brake pedal. This ensures that the brake pedal is completely encircled and trapped in the rigid structure formed by the first and second crosshead and first and third shaft members further improves the security of the device.

Conveniently, the jaw member forming portion is V-section groove in the second crosshead which groove opens away from the foot for receipt of a shaft member of the brake pedal.

Preferably, the one shaft member terminates in an enlarged annular flange by which the one shaft member is rotatively mounted in a rebate in the lower face of the second crosshead and resilient means, desirably a split spring washer, seated on the shaft member trapped between the flange and the second crosshead, biassing the jaw member in a pedal clamping direction. The resilient means ensures that any play or slack arising either as a result of imperfect tightening, tolerances or illicit manipulation to dislodge the device ensuring that the jaw member remains in clamping engagement with the brake pedal.

A third bore is formed in a portion of the second crosshead located on an opposite side of the jaw member from the first bore and a wedging pin extends from the first crosshead in parallel relation to the first and second shaft member and aligned for receipt in the third bore when the jaw member is in clamping engagement with the brake pedal so that the brake pedal is completely encircled and trapped between the first and second crosshead and first and third shaft members.

BRIEF DESCRIPTION OF THE DRAWINGS

A specific embodiment of the invention will now be described with reference to the accompanying drawings in which:

FIG. 1 is a front elevational view, with parts broken away of an anti-theft device according to the invention;

FIG. 2 is a fragmentary side elevational view of an upper portion of the device;

FIG. 3 is a schematic plan view of a first crosshead of the device with a brake pedal barrier attached thereto;

FIG. 4 is a schematic plan view of a second crosshead of the device;

FIG. 5 is a schematic plan view of a third crosshead of the device;

FIG. 6 is a schematic end view of the third crosshead;

FIGS. 7 is a front elevational view of the first crosshead with the brake pedal barrier attached;

FIG. 8 is a plan view of the first crosshead showing the position of the brake pedal and shaft thereof in relation to the brake pedal barrier;

FIG. 9 is a fragmentary side elevational view of the first and second crossheads clamping the brake shaft between them.

DESCRIPTION OF PARTICULAR EMBODIMENTS

The anti-theft device comprises first and second shaft members 1 and 2, respectively, linked together, side by side, spaced apart in parallel relation by first, second and third crossheads 3, 4 and 5, respectively. A third, wedging pin forming shaft 6 is also permanently linked to extend parallel to the first and second shafts by the first and third crossheads 4 and 5.

As shown in FIGS. 1, 3 and 7–9, the first crosshead 3 is a metal block formed with first, second and third bores 7, 8 and 9, respectively. The first bore 7 is threaded for screw receipt of a lower, threaded portion 24 of the first shaft member 1 and the second and third shaft members 2 and 6, respectively, are received as longitudinal sliding fits in second and third through-bores 8 and 9, respectively.

As shown in FIGS. 1, 4 and 9, the second crosshead 4 is formed with first, second and third through-bores 10, 11, and 12, respectively. The first bore 10 has upper and lower enlarged counterbores 14 and 15, respectively, as shown in FIGS. 1 and 10, for rotative receipt of a lower end of the first shaft member.

A flat based, V-section groove 17, with sidewalls inclined at 17 degrees, is formed in an upper side of the second crosshead at a location between the first and third through-bores 10 and 12, respectively, for receipt of a rear portion of a shaft of a brake pedal. The end of the second crosshead remote from the second shaft is cut away at 60 degrees to provide a guide surface for entry of a brake pedal shaft into the area between the first and the second crossheads As shown in FIGS. 5 and 6, the third crosshead is also formed as a metal block with first, second and third through bores 18, 19, and 20, respectively. Bores or sockets 18 and 20 anchor upper ends of shaft members 2 and 6, respectively and through-bore 18 is force fitted with lower end portion of a sleeve 21 receiving the upper end portion of the shaft member 1, further described below.

The shaft member 1 is a cylindrical metal rod having a lower end terminating in a head 22 connected by a reduced diameter neck 23 to a threaded portion 24. The neck 23 extends through bore 10 with the head rotatively mounted in counterbore 15.

A washer 31 is mounted on the neck immediately above the head and traps a split spring washer 32 on the neck against the base wall of the counterbore 15.

The upper portion of the shaft member 1 is provided with two longitudinally extending series of transverse locking grooves 34 on respective opposite sides which may either be of the elliptical profile shown in FIG. 1 or parallel walled channels (not, shown, for strength), and has a handle 35 mounted on an upper end.

The metal sleeve 21 completes surrounds the locking grooves and is formed with a lock housing 36 carrying a conventional key operated locking mechanism provided with catch means comprising a latching bar (not shown) for latching receipt in one or more selected grooves enabling adjustment of the final clamping position.

The second shaft member 2 is a metal bar terminating in a transverse foot 39 aligned below the second crosshead.

As shown in FIGS. 1, and 7–9, an obstructive barrier or masking frame 51 is attached to the first crosshead to obstruct access to the pedal clamping mechanism and to further deter a potential thief. The frame comprises two parallel metal bars 52 welded adjacent one common end to opposite ends of the first crosshead and a third metal cross bar 53 welded to other ends of the parallel bars. A second crossbar 54 is also welded to the crosshead and to bars 52 for preventing forcible tool access. The cross bar 53 is centered on the V-section groove so that it will be centered in relation to the brake pedal shaft 61.

The device is installed by adjusting the separation of the first and second crossheads 3 and 4 (so that the second crosshead is adjacent the foot 39) to the position shown in FIG. 1, to enable receipt of the shaft 61 of a brake pedal 60 therebetween and the device simply swung to position the V-section groove under the brake pedal shaft with the foot 39 resting on the vehicle floor. The handle 35 is then turned causing the first and second crossheads 3 and 4, respectively, to move toward each other into clamping engagement with the brake pedal shaft completely enclosing and trapping the brake pedal shaft between them at its usual height. The handle 35 is then pulled while placing a downward pressure on the sleeve 21 or lock housing 36 to maintain the foot 39 against the floor, thereby raising the first shaft 1 and therefore the first and second crossheads 3 and 4 and brake pedal shaft together a small distance to impose a light tension on the brake pedal shaft and causing the free end of the third shaft 6 to enter through-bore 12 to provide additional locking. The fully locked position is shown in FIG. 8 and 9.

Thus, the first and second crossheads 3 and 4 constitute a pair of brake pedal shaft clamping jaws with the groove 17 forming a hooked section. The barrier frame 51 hinders tool access to the clamping area, increasing security.

A particular advantage arising from immobilizing the brake pedal in the "off" position is that, with most modern automatic gearboxes, shift into a drive gear is prevented without depression of the brake pedal.

I claim:

1. A portable anti-theft device for immobilizing a brake pedal of a motor vehicle comprising:

a first shaft member and a second shaft member;

first and second crossheads extending transversely of the first shaft member and the second shaft member at longitudinally spaced apart locations thereof thereby mounting the first shaft member and the second shaft member extending along respective, separate parallel axes;

the first and second crossheads providing, respectively, first and second, cooperating jaw members, with the second jaw member extending transversely from a lower end of the first shaft member; said second jaw member having a brake shaft receiving notch in the second crosshead;

the first crosshead having two bores and a latching pin extending therefrom in parallel relation to the first and second shaft members, one bore being threaded and receiving a complementary threaded portion of the first shaft member as a screw fit and the other bore receiving the second shaft member as a longitudinal sliding fit, thereby linking the first shaft member and the second shaft member together for relative longitudinal movement;

the second crosshead having plural bores, one bore rotatively mounting a lower end of the first shaft member a second bore receiving the second shaft member in a longitudinal sliding fit, and a third bore located on a side of the brake shaft receiving notch remote from the first shaft; said latching pin being aligned for receipt in the third bore when the first and second jaw members are in clamping engagement with the brake pedal shaft so that the brake pedal shaft is completely encircled and trapped between the first crosshead, the second crosshead, the first shaft member and the latching pin;

a stand-off on a lower end of the second shaft member extending below the second jaw member for engaging a floor of a vehicle below the brake pedal;

handle means on an upper end of the first shaft member for maintaining alignment of the first and second jaw members over and below a brake pedal shaft, respectively, by resting the stand-off on the floor and turning said handle means to rotate the first shaft thereby moving the first and second jaw members relatively toward each other in a screw action to clamp between them the brake pedal shaft behind a brake pedal pad, with the stand-off remaining in position during and after the clamping movement adjustment; and, means for locking the first shaft member and the second shaft member together against relative longitudinal movement to maintain a selected separation of the jaw members and stand-off in a brake pedal clamping position and to prevent rotation of the first shaft thereby maintaining the first and second jaw members in clamping engagement with the brake pedal shaft.

2. A device according to claim 1 wherein the first shaft member is rotatively mounted on the second crosshead at a location thereof between the brake shaft receiving notch and the second shaft member.

3. A device according to claim 1 wherein a barrier frame is attached to the first crosshead to extend above a brake pedal clamped thereby.

4. A portable anti-theft device for immobilizing a brake pedal of a motor vehicle comprising:

a first shaft member and a second shaft member;

first, second and third crossheads extending transversely of the first shaft member and the second shaft member at longitudinally spaced apart locations thereof, thereby mounting the first shaft member and the second shaft member extending along respective, separate parallel axes, the first crosshead being located between the second and third crossheads and the first and second crossheads providing, respectively, first and second, cooperating jaw members, with the second jaw member extending transversely from a lower end of the first shaft member;

the first crosshead having two bores, one of the bores of the first crosshead being threaded and receiving a complementary threaded portion of the first shaft member as a screw fit and another of the bores of the first crosshead receiving the second shaft member as a longitudinal sliding fit, thereby linking the first shaft member and the second shaft members together for relative longitudinal movement;

the second crosshead having two bores, one of the bores of the second crosshead rotatively mounting a lower end of the first shaft member and another of the bores of the second crosshead receiving the second shaft member as a longitudinal sliding fit;

the third crosshead having two bores, one of the bores of the third crosshead anchoring an uppermost end of the second shaft member and another of the bores of the third crosshead receiving the first shaft member as a longitudinal sliding fit;

a stand-off on a lower end of the second shaft member extending below the second jaw member for engaging a floor of a vehicle below the brake pedal;

handle means on an upper end of the first shaft member for maintaining alignment of the first and second jaw members over and below a brake pedal shaft, respectively, by resting the stand-off on the floor and turning said handle means to rotate the first shaft thereby moving the first and second jaw members relatively toward each other longitudinally in a screw action to clamp between them the brake pedal shaft behind a brake pedal pad, with the stand-off remaining in position during and after the clamping movement adjustment; and, means for locking the first shaft member and the second shaft member together against relative longitudinal movement to maintain a selected separation of the jaw member and stand-off in a brake pedal clamping position and to prevent rotation of the first shaft thereby maintaining the first and second jaw members in clamping engagement with the brake pedal shaft.

5. A device according to claim 4 further comprising a sleeve which receives an upper portion of the first shaft member as a longitudinal sliding fit and extends between the third crosshead and the handle and has a lower axial end anchored against movement in the third crosshead and the locking means comprises a longitudinally extending series of locking depressions formed in the upper portion of the first shaft and a latch housing mounted on the sleeve and carrying a latching bar for releasable receipt in a selected depression.

6. A device according to claim 4 wherein the first jaw member comprises a brake shaft receiving notch in the second crosshead.

7. A device according to claim 6 wherein the first shaft member is rotatively mounted on the second crosshead at a location thereof between the brake shaft receiving notch and the second shaft member.

8. A device according to claim 7 wherein a third bore is formed in a portion of the second crosshead located on a side of the brake shaft receiving notch remote from the first shaft and a latching pin having an upper end anchored in the third crosshead extends in parallel relation to the first and second shaft member as a sliding fit through a third bore formed in the first crosshead and aligned for receipt in the third bore in the second crosshead when the first and second jaw members are in clamping engagement with the brake pedal shaft so that the brake pedal shaft is completely encircled and trapped between the first crosshead, the second crosshead, the first shaft member and the latching pin.

9. A device according to claim 4 wherein a barrier frame is attached to the first crosshead to extend above a brake pedal clamped thereby.

10. A device according to claim 9 wherein the first shaft member terminates in an enlarged annular flange by which the first shaft member is rotatively mounted in a rebate in the lower face of the second crosshead and resilient means is seated on the first shaft member trapped between the flange and the second crosshead, biassing the second jaw member in a pedal clamping direction.

11. A device according to claim 10 wherein the resilient means comprises a split spring washer encircling the first shaft member.

12. A portable anti-theft device for immobilizing a brake pedal of a motor vehicle comprising:

a first shaft member and a second shaft member;

first, second and third crossheads extending transversely of the first shaft member and the second shaft member at longitudinally spaced apart locations thereof, thereby mounting the first shaft member and the second shaft member extending along respective, separate parallel axes, the first crosshead being located between the second and third crossheads and the first and second crossheads providing, respectively, first and second, cooperating jaw members, with the second jaw member extending transversely from a lower end of the first shaft member;

the first crosshead having two bores, one of the bores of the first crosshead being threaded and receiving a complementary threaded portion of the first shaft member as a screw fit and another of the bores of the first crosshead receiving the second shaft member as a longitudinal sliding fit, thereby linking the first shaft member and the second shaft members together for relative longitudinal movement;

the second crosshead having two bores, one of the bores of the second crosshead rotatively mounting a lower end of the first shaft member and another of the bores of the second crosshead receiving the second shaft member as a longitudinal sliding fit;

the third crosshead anchoring an uppermost end of the second shaft member and having a bore receiving the first shaft member as a longitudinal sliding fit;

a stand-off on a lower end of the second shaft member extending below the second jaw member for engaging a floor of a vehicle below the brake pedal;

handle means on an upper end of the first shaft member for maintaining alignment of the first and second jaw members over and below a brake pedal shaft, respectively, by resting the stand-off on the floor and turning said handle means to rotate the first shaft thereby moving the first and second jaw members relatively toward each other longitudinally in a screw action to clamp between them the brake pedal shaft behind a brake pedal pad, with the stand-off remaining in position during and after the clamping movement adjustment;

a sleeve which receives an upper portion of the first shaft member as a longitudinal sliding fit and extends between the third crosshead and the handle means and has a lower axial end anchored against movement in the third crosshead; and, locking means comprises a longitudinally extending series of locking depressions formed in the upper portion of the first shaft and a latch housing mounted on the sleeve and carrying a latching bar for releasable receipt in a selected depression;

the locking means being operable to lock the first shaft member and the second shaft member together against relative longitudinal movement to maintain a selected separation of the jaw member and stand-off in a brake pedal clamping position and to prevent rotation of the first shaft thereby maintaining the first and second jaw members in clamping engagement with the brake pedal shaft.

13. A device according to claim 12 wherein a third bore is formed in a portion of the second crosshead located on a side of the brake shaft receiving notch remote from the first shaft and a latching pin having an upper end anchored in the third crosshead extends in parallel relation to the first and second shaft member as a sliding fit through a third bore formed in the first crosshead and aligned for receipt in the third bore in the second crosshead when the first and second jaw members are in clamping engagement with the brake pedal shaft so that the brake pedal shaft is completely encircled and trapped between the first crosshead, the second crosshead, the first shaft member and the latching pin.

* * * * *